(12) United States Patent
Schleifer et al.

(10) Patent No.: US 9,268,960 B2
(45) Date of Patent: Feb. 23, 2016

(54) MODERATION OF SHARED DATA OBJECTS

(75) Inventors: Jason Schleifer, Cambridge, MA (US); Richard Zack Speyer, Cambridge, MA (US); John R. Burkhardt, Arlington, MA (US); Ransom Richardson, Beverly, MA (US); Steven Lees, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 393 days.

(21) Appl. No.: 13/150,393

(22) Filed: Jun. 1, 2011

(65) Prior Publication Data
US 2012/0311725 A1  Dec. 6, 2012

(51) Int. Cl.
*G06F 21/60* (2013.01)
*G06F 21/62* (2013.01)

(52) U.S. Cl.
CPC .................................. *G06F 21/6218* (2013.01)

(58) Field of Classification Search
CPC ............... G06F 21/60; G06F 21/6218; G06F 17/30085; G06F 17/30386; G06F 21/554; G06F 9/443
USPC ............... 707/705, 785, E17.005; 726/29–30
See application file for complete search history.

(56) References Cited

U.S. PATENT DOCUMENTS

| 6,564,201 | B1 | 5/2003 | Hamsa | |
|---|---|---|---|---|
| 6,604,109 | B1 | 8/2003 | Federighi et al. | |
| 7,584,454 | B1 | 9/2009 | Massoudi | |
| 7,895,651 | B2 * | 2/2011 | Brennan | G06F 21/55 705/51 |
| 7,969,986 | B2 * | 6/2011 | Yanai et al. | 370/395.2 |
| 8,312,431 | B1 * | 11/2012 | Moffat | G06F 9/445 717/120 |
| 2002/0029245 | A1 | 3/2002 | Nahon | |
| 2005/0256590 | A1 * | 11/2005 | Choi | 700/20 |
| 2007/0179954 | A1 * | 8/2007 | Kudoh et al. | 707/9 |
| 2008/0256554 | A1 * | 10/2008 | Yassin | 719/315 |
| 2009/0006487 | A1 | 1/2009 | Gavrilov | |
| 2009/0144282 | A1 * | 6/2009 | Uramoto | G06F 21/6218 |
| 2009/0162828 | A1 * | 6/2009 | Strachan | G06F 17/30056 434/350 |
| 2009/0293064 | A1 | 11/2009 | Behrendt | |
| 2011/0161946 | A1 * | 6/2011 | Thomson | G06F 8/34 717/155 |
| 2012/0246705 | A1 * | 9/2012 | Brown | G06F 21/6218 726/4 |

FOREIGN PATENT DOCUMENTS

WO  2006078002 A2  7/2006

OTHER PUBLICATIONS

Chen, et al., "A Transactional Nested Process Management System", In ICDE '96 Proceedings of the Twelfth International Conference on Data Engineering, 1996 IEEE, Feb. 26-Mar. 1, 1996, 8 pages.

\* cited by examiner

*Primary Examiner* — Michael Chao
*Assistant Examiner* — Shiuh-Huei Ku
(74) *Attorney, Agent, or Firm* — Aaron Chatterjee; Kate Drakos; Micky Minhas

(57) ABSTRACT

Methods, system, and computer storage media are provided for moderating actions performed on shared data objects. Rule enforcement logic is received for an application that is associated with one or more data objects shared between various clients. The rule enforcement logic is stored at a data server that also stores data associated with data objects. A moderator, also stored on the data server, is used to enforce the rule enforcement logic corresponding to the application when a client attempts to perform an action to a data object associated with the application.

20 Claims, 4 Drawing Sheets

MODERATION OF SHARED DATA OBJECTS

BACKGROUND

With improved connectivity and access of computers and other devices to various networks, it has become commonplace for different programs, or clients, to share access to the same information, such as data objects. Sharing of data objects enables the sharing of information in real-time across multiple, disparate clients, such as machines that are running multiple pieces of technology. With the sharing of data object comes the inevitable issue of access to the data objects, including who is allowed to modify the data and what modifications are allowed. In many systems, logic to enforce various rules is stored by each client, which leaves the system vulnerable to a rogue client bypassing checks and invalidating or tampering with the data. Further, the client itself could monitor its own shared data, but this is likely to prove to be prohibitively expensive for that client. Additionally, it may be challenging for a developer to accurately revert a disallowed modification once it has already been propagated to all clients that share access to that particular data object since the old values may no longer be saved in the system.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to the use of a server side moderator that enforces logic supplied by the developer of an application to determine what actions may be taken to data objects associated with that application. Instead of being stored on the client side, the rule enforcement logic may now be stored on the server along with data that comprises the shared data objects. When a client attempts to modify a data object, for instance, that modification is first approved or rejected by a moderator before the change is saved and propagated to other clients that share the same data object. If the client is not allowed to make that particular modification, the modification is not made. In this instance, other clients that share that data object may not even know that the modification was attempted. If the client is allowed to make that particular modification, the modification is allowed.

BRIEF DESCRIPTION OF THE DRAWINGS

The present invention is described in detail below with reference to the attached drawing figures, wherein.

DETAILED DESCRIPTION

Figure 1:
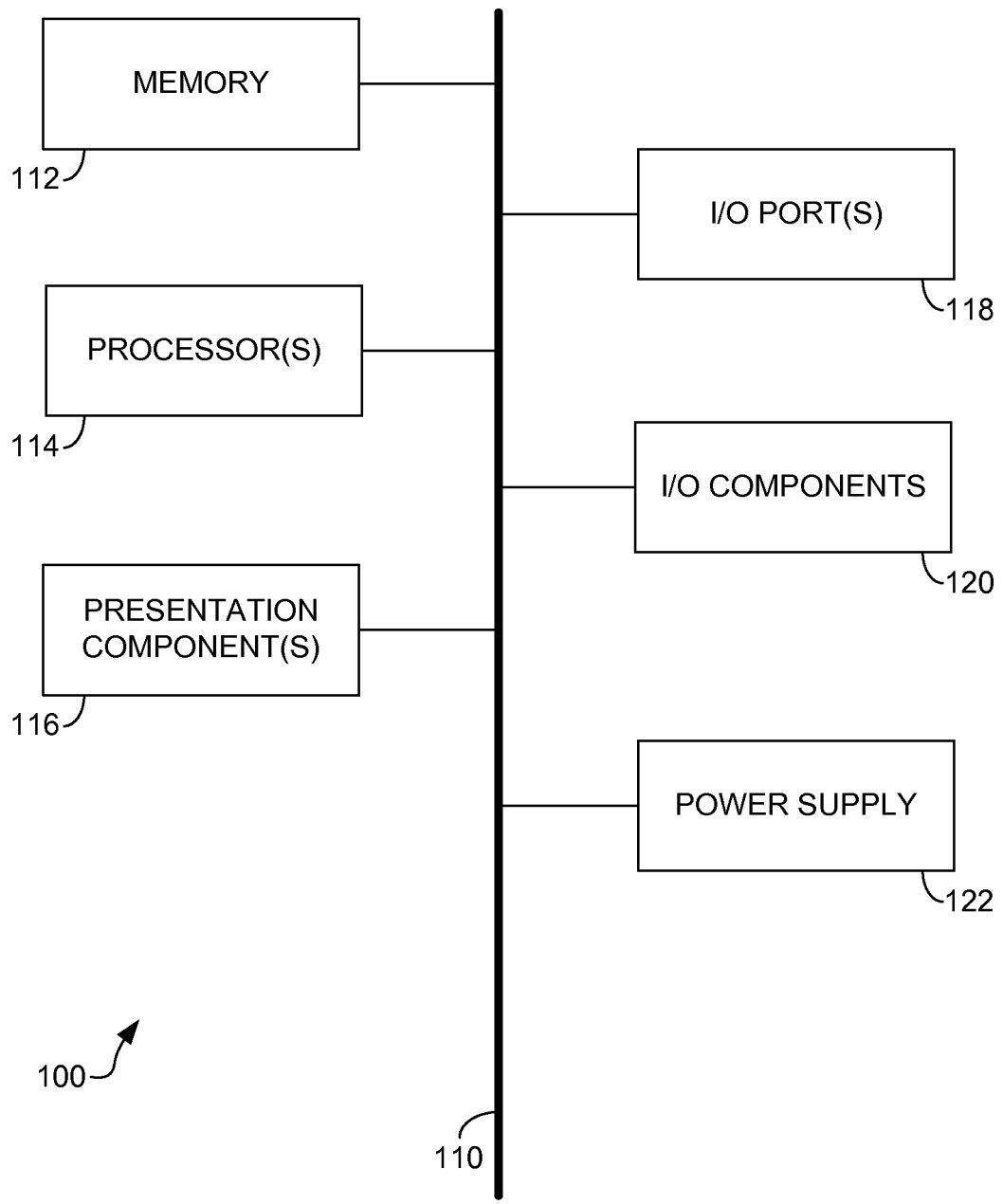
FIG. 1 depicts a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to methods and systems for providing moderation of attempted actions taken to shared data objects. At the data server where data and rule enforcement logic is stored, data is first partitioned by application and then by application instance. Here, a moderator is at the application level on the server. When an instance of the moderator is present within an application, all incoming changes for all application instances are first passed to the moderator, which can either accept or reject the change. If the change is accepted, the server will continue regular execution by committing the change and sending it out to all registered clients. If the change is rejected, the server sends an error message to the client that attempted to make the change, and the change is automatically reverted using built in client side logic.

Accordingly, in one aspect, an embodiment of the present invention is directed to one or more computer storage media storing computer-useable instructions that, when used by one or more computing devices, cause the one or more computing devices to perform a method of moderating actions performed on shared data objects. The method includes receiving rule enforcement logic for an application. The application is associated with one or more application instances, each of which contains one or more data objects that are shared between two or more clients. Further, the method includes storing the rule enforcement logic at a data server that stores data associated with a plurality of data objects and rule enforcement logic corresponding to a plurality of applications associated with the plurality of data objects. Additionally, the method includes utilizing a moderator stored on the data server to enforce the rule enforcement logic associated with the application when one of the two or more clients attempts to perform an action to one of the one or more associated data objects. The action comprises one or more of opening the data object, deleting the data object, or modifying the data that comprises the data object.

In another embodiment, an aspect of the invention is directed to one or more computer storage media storing computer-useable instructions that, when used by one or more computing devices, cause the one or more computing devices to perform a method of moderating actions performed on shared data objects. The method includes receiving a request from a client to perform an action to a data object whose data is stored on a data server, determining whether the data server has stored rule enforcement logic that corresponds to an application associated with the data object. If the data server has stored the rule enforcement logic corresponding to the application associated with the data object, the method further includes utilizing the rule enforcement logic to determine whether the client is allowed to perform the requested action to the data object, performing the requested action to the data object if it is determined that the client is allowed to perform the requested action to the data object, and not performing the requested action to the data object and communicating an error message to the client if it is determined that the client is not allowed to perform the requested action to the data object. Further, if the data server does not have stored the rule enforcement logic corresponding to the application associated with the data object, the method includes performing the requested action to the data object.

A further embodiment of the present invention is directed to a shared data system including one or more computing devices having one or more processors and one or more computer storage media. The shared data system includes a server that comprises a data store that stores data associated with a plurality of data objects and rule enforcement logic corresponding to a plurality of applications associated with at least a portion of the plurality of data objects. The rule enforcement logic is developed by and received from a developer of a respective application. The server further includes a moderator that enforces the rule enforcement logic for the plurality of applications associated with the at least the portion of the plurality of data objects such that when a client attempts to perform an action to a data object, the moderator determines whether the action is allowed based on the corresponding rule enforcement logic for the application associated with that particular data object. If the moderator determines that the action is allowed, the server allows the action, but if the moderator determines that the action is not allowed, the server does not allow the action and communicates an error message to the client indicating that the action is not allowed.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
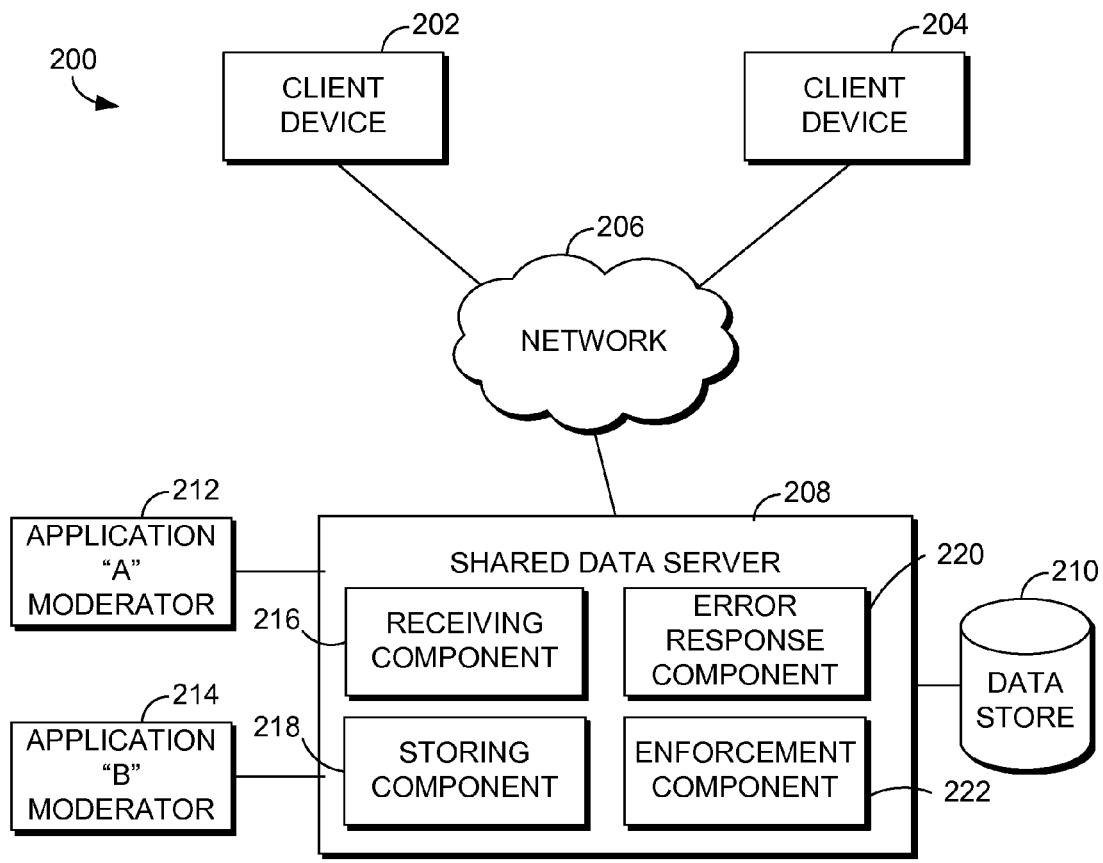
FIG. 2 depicts a block diagram that illustrates a computing environment suitable for embodiments of the present invention.

Referring now to FIG. 2, a block diagram is provided illustrating an exemplary computing system environment 200 suitable for use in implementing embodiments of the present invention. It will be understood and appreciated by those of ordinary skill in the art that the computing system environment 200 shown in FIG. 2 is merely an example of one suitable computing system environment and is not intended to suggest any limitation as to the scope of use or functionality of embodiments of the present invention. Neither should the computing system environment 200 be interpreted as having any dependency or requirement related to any single module/component or combination of modules/components illustrated therein. Among other components not shown, the system 200 includes client devices 202 and 204, a shared data server 208, a data store 210, an application "A" moderator 212, and an application "B" moderator 214, all in communication with one another through a network 206. The network 206 may include, without limitation, one or more local area networks (LANs) and/or wide area networks (WANs). Such networking environments are commonplace in offices, enterprise-wide computer networks, intranets, and the Internet. Accordingly, the network 206 is not further described herein.

In some embodiments, one or more of the illustrated components/modules may be implemented as stand-alone applications. In other embodiments, one or more of the illustrated components/modules may be integrated directly into other components. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers, client devices, or the like. By way of example only, the shared data server 208 might reside on a larger server, cluster of servers, or a computing device remote from one or more of the remaining components. Further, application "A" moderator 212 and application "B" moderator 214 may reside directly on the shared data server 208, although shown here as separate components. For instance, in one embodiment, the moderators are logic that is simply stored on the shared data server 208.

Data objects, as used herein, refer to any entity that is able to be manipulated by commands of one or more programming languages, such as value, variable, function, or data structure. In software development, objects are used to implement abstract data structures by bringing together the data components with the procedures that manipulate them. An object stores its state in fields, or variables in some programming languages, and exposes its behavior through methods, or functions in some programming languages. Many instances of a particular object may exist, and thus these instances belong to a particular class, which is the blueprint from which individual objects are created. Once created, objects may be updated or modified by a number of clients. In one embodiment, a client attempts to perform an action (e.g., open, close, delete, modify) on a data object that has been opened using a particular application. As used herein, an application is computer software designed to assist a user to perform tasks, and as mentioned, may be used to open and modify various data objects, including documents.

With continued reference to FIG. 2, each of client devices 202 and 204, data server 208, and moderators 212 and 214 may be any type of computing device, such as computing device 100 described with reference to FIG. 1, for example. The components may communicate with each other via a network 206, which may include, without limitation, one or more local area networks (LANs) and/or wide area networks (WANs). Such networking environments are commonplace in offices, enterprise-wide computer networks, intranets, and the Internet. It should be understood that any number of client devices, servers, and data stores may be employed within the system 200 within the scope of the present invention. Each may comprise a single device or multiple devices cooperating in a distributed environment. For instance, the shared data server 208 may comprise multiple devices arranged in a distributed environment that collectively provide the functionality of the shared data server 208 described herein. Additionally, other components not shown may also be included within the system 200, while components shown in FIG. 2 may be omitted in some embodiments.

The client devices 202 and 204 may be any type of computing device owned and/or operated by a client that can access the network 206. For instance, each of the client devices 202 and 204 may be a desktop computer, a laptop computer, a tablet computer, a mobile device, or any other device having network access. Generally, a client may employ the client devices 202 and 204 to, among other things, attempt to open, delete, modify, etc., a data object stored on the shared data server 208 using an application. In one instance, a client utilizes the client device 202, for example, to attempt to access and modify a data object, by way of an application, stored on the shared data server 208. As will be described herein, logic on the server may dictate whether this client is even allowed to open that data object, let alone make any modifications to it that are then stored on the server and accessible to other clients.

The shared data server 208 comprises various components, including a receiving component 216, a storing component 218, an error response component 220, and an enforcement component 222. Generally, the receiving component 216 is configured to receive rule enforcement logic from a developer of an application, typically referred to as an originating client. Rule enforcement logic is logic that, in one embodiment, is provided by the developer of an application that may be used in conjunction with data objects. Instead of being stored by each developer individually, the rule enforcement logic may be stored by the system, such as on the shared data server 208 or the data store 210. Alternatively, the rule enforcement logic is stored on a separate moderator, as shown in FIG. 2.

There may be some issues with safety, such as tampering with the logic or data, if the logic is stored or if it exists within the client code. Storing of the logic with the client code would leave the logic to be vulnerable to a rogue client bypassing these checks and invalidating or tampering with the data. Another alternative includes a developer writing custom logic on its own server, which would serve to monitor the shared data and revert invalid changes, but in many cases this is prohibitively expensive to keep this in sync. It would also be very challenging for the developer to accurately revert an invalid change once it has already propagated the changes to all clients, as the old value would no longer be in the system. Yet another alternative would be if the developer could discard using the existing shared data service and instead write its own fully customized service. While possible, the developer would be ultimately responsible for all the challenges of writing an asynchronous shared data service, including keeping the data synchronized across all clients in real time, and making the system scale to many users. As such, storing the rule enforcement logic on the shared data server has many benefits, including securing of the logic and data and less expensive in terms of keeping the changes in sync. The receiving component 216 is also configured to receive actions that have been attempted on a particular application or data object. For example, client device 202 may have attempted to modify data in a particular application that has corresponding rule enforcement logic. The receiving component 216 receives an indication of this attempted modification and enlists the appropriate moderator to determine whether that modification will be accepted or rejected.

The storing component 218 is configured to determine how and where to store rule enforcement logic received from a particular developer. In embodiments, the rule enforcement logic is stored directly in the shared data server 208, but in another embodiment, it may be stored on a separate data store, such as data store 210 that is operably connected to the shared data server 208. The data store 210, in one embodiment, stores data associated with data objects and rule enforcement logic corresponding to a plurality of applications associated with the data objects.

The error response component 220 is configured to produce an error message and communicate it to a client who has attempted an action to a data object or application, but whose attempted action has been rejected by enforcement of the rule enforcement logic for that particular application. For example, if a first client utilizing client device 202 is attempting to open a particular data object using application "A," application "A" moderator 212 utilizes the corresponding rule enforcement logic to determine whether the open request is approved or rejected. If rejected, the error response component 220 may communicate an error request to the first client indicating that the data object cannot be opened according to the rule enforcement logic provided by the developer of the application used in conjunction with the data object.

The enforcement component 222 is configured to be in direct communication with the moderators to enforce rule enforcement logic. In one embodiment, the enforcement component 222 is responsible for determining whether a particular application has rule enforcement logic associated with it. In some instances, not all applications have corresponding rule enforcement logic.

The application moderators 212 and 214 are illustrated as separate components from the shared data server 208. While these moderators are illustrated as separate components in FIG. 2, in some embodiments, the client moderators 212 and 214 are actually integrated into the shared data server 208. For instance, the client moderators 212 and 214 may comprise rule enforcement logic that is stored on the shared data server 208, and structurally may not be a separate component. There are many alternatives as far as the structure of the system. FIG. 2 is illustrated for exemplary purposes only. Generally, moderators 212 and 214 enforce rule enforcement logic for applications such that when a client attempts to perform an action to a data object associated with the application, the moderator determines whether the action is allowed based on the corresponding rule enforcement logic for the application associated with that particular data object.

Figure 3:
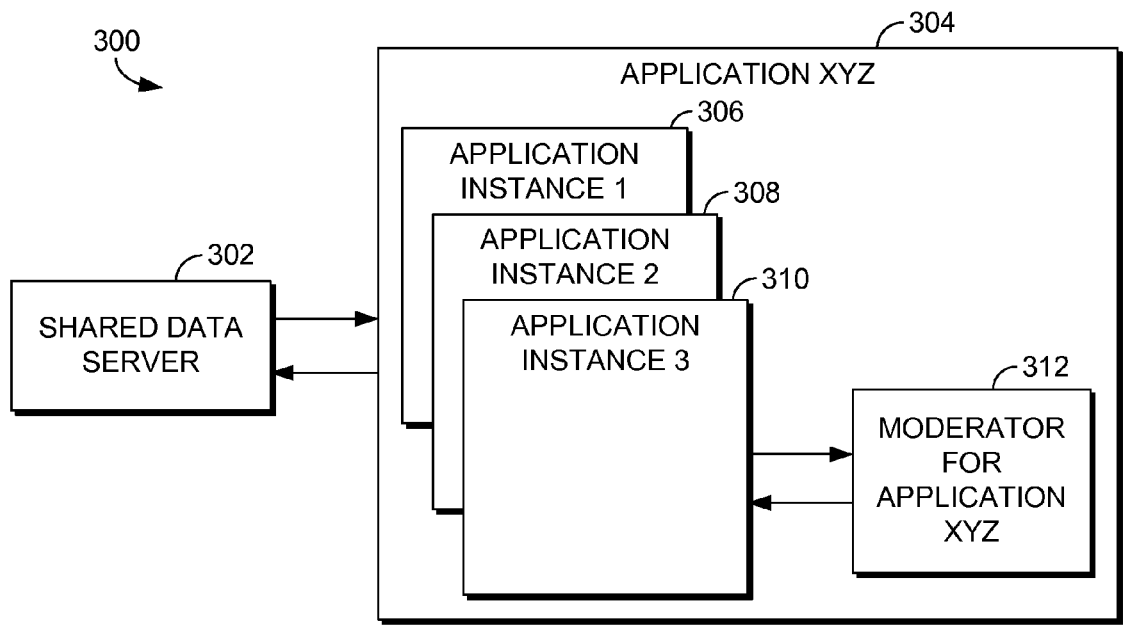
FIG. 3 illustrates a block level architecture diagram of a shared data server.

Generally, application "A" moderator 212 is utilized to enforce logic provided by, for example, the developer of application "A". The developer of application "A" may have the ability to "preview" incoming changes to shared resources (e.g., application "A") and then approve or reject these changes before the changes are propagated to the rest of the system based on application-specific logic. This system supports reverting the local change on the client who attempted to make the change if the moderator has rejected it based on the corresponding rule enforcement logic. As such, many different applications/data objects can store shared data on the same server, and each application can have its own, unique, version of rule enforcement logic. As the rule enforcement logic is unique for each application, the moderators act on an application level on the server. This is shown in FIG. 3 discussed below. When rule enforcement logic is stored on the shared data server (e.g., data store 210, moderators 212 or 214) for a particular application, all incoming changes for all application instances are first passed to the moderator, which may either accept or reject the change. If the change is accepted, the server will continue regular execution, commit the change, and communicate it out to all registered clients. If the change is rejected, however, the shared data server 208 may, in one embodiment, communicate an error message to the client that attempted to perform the action to the data object, indicating that the action is not allowed. The change to the data object may then be automatically reverted using built-in client side logic.

The moderators are provided to developers of applications and data objects, as they expose "preview" events for all types of incoming changes, or attempted actions, as previously mentioned. These actions may include creation, deletion, opening, closing, modifying in any way, etc. These actions can either be sent for all resources in the shared system, or for a limited set in which the application is interested in. The developer may then attach its own custom logic to each event to decide when to approve or reject a given change. In one embodiment, when one of these events fires, the developer is provided with all of the pertinent information about the incoming change, such as what the action is and who is attempting to execute the change. Additionally, the moderator has a full representation of the shared data as it is seen by the clients. The developer is responsible for writing any logic it desires that the moderator execute. Once complete, the developer registers its custom moderator (e.g., rule enforcement logic) with the shared data service, which will then execute the rule enforcement logic whenever there is a change to the corresponding application/data object.

Referring now to FIG. 3, a block level architecture diagram 300 is illustrated of a shared data server. A shared data server 302 may be similar or the same as the shared data server 208 described in reference to FIG. 2. For a particular data object or application, such as application XYZ 304, multiple instances of that application may exist. Here, each application instance, including application instance 1 306, application instance 2 308, and application instance 3 310 represent three instances of application XYZ 304. The moderator for application XYZ 312 resides at the application level and communicates with all active instances of the application.

Figure 4:
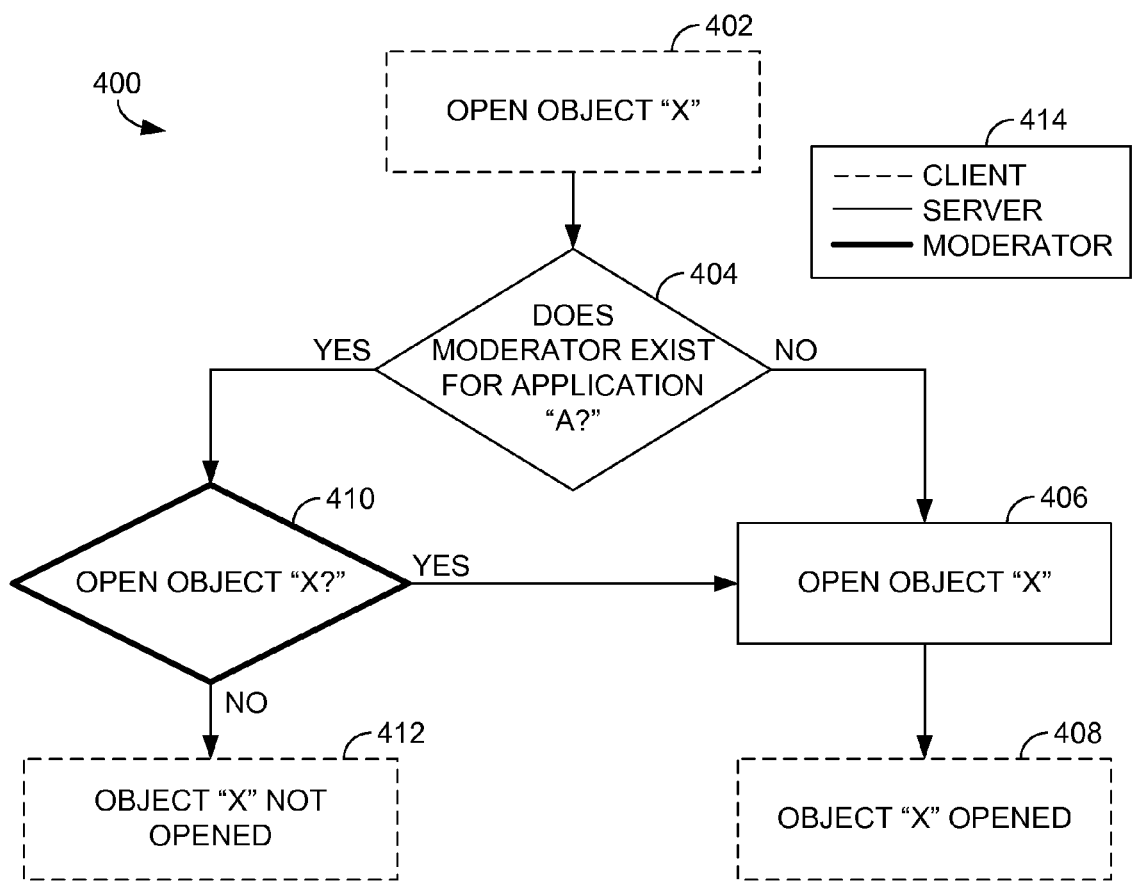
FIG. 4 illustrates a flow diagram showing a method for moderating shared data objects, in accordance with an embodiment of the present invention.

FIG. 4 illustrates a flow diagram showing a method 400 for moderating shared data objects, in accordance with an embodiment of the present invention. Various steps may be performed by either a client, the server, or the moderator. The legend 414 provides an indication as to which steps are performed by which component. Initially at step 402, object "X" is opened by a client. At step 404, it is determined by the server as to whether a moderator (e.g., rule enforcement logic) exists for application "A." If a moderator does not exist for application "A," the typical response by the server is to go ahead and allow the client to open object "X," shown at step 406. At step 408, object "X" is opened on the client side. If, however, a moderator (e.g., rule enforcement logic) does exist for that application, the rule enforcement logic is used to determine whether the client is allowed to open object "X," shown at step 410. This decision is made by the moderator. If the client is not allowed to open object "X," the object is not opened at step 412.

Figure 5:
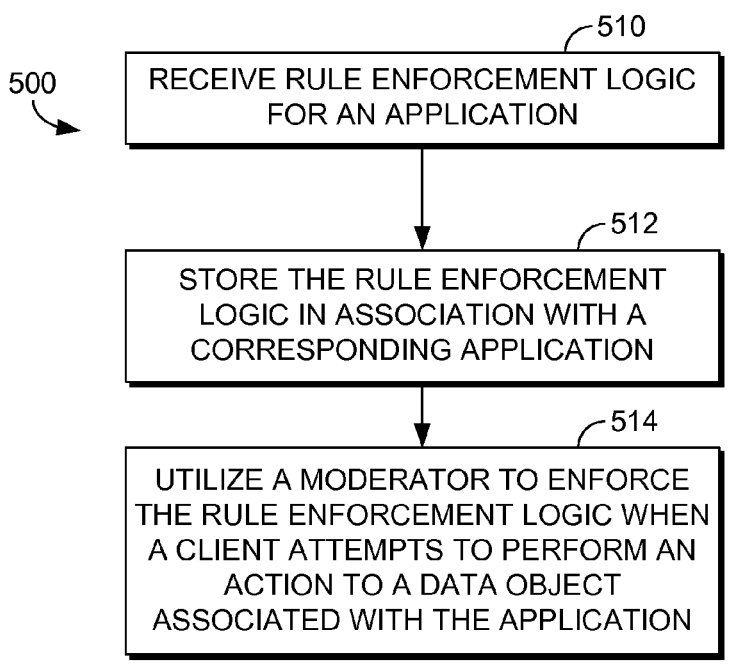
FIG. 5 illustrates a flow diagram showing a method for moderating actions performed on shared data objects, in accordance with an embodiment of the present invention.

Turning to FIG. 5, a flow diagram showing a method 500 for moderating actions performed on shared data objects is depicted, in accordance with an embodiment of the present invention. Initially at step 510, rule enforcement logic is received for an application. In one embodiment, the rule enforcement logic is received from a developer of the application, also termed an originating client. The application is associated with one or more data objects that are shared between two or more clients. For instance, the application may be used to open and make modifications to a data object. Applications may also be used as a way to separate data and rule enforcement logic between different developer's code to avoid naming collisions, etc. Examples may include a game of chess, a chat application, or the like. The clients, as used herein, may include, for exemplary purposes only, a computer, a web browser, a mobile device, or a gaming system. Other types of clients may also be used to carry out embodiments of the present invention.

At step 512, the rule enforcement logic is stored at a data server that stores data associated with a plurality of data objects. The data server also stores rule enforcement logic corresponding to a plurality of applications associated with the plurality of data objects. For instance, a single application may be useable with one or more data objects. It should be noted that the rule enforcement logic is not stored at a client site along with code corresponding to the data object or application. Instead, here, it is stored at the data server where data that comprises data objects is also stored. At step 514, a moderator is used to enforce the rule enforcement logic (e.g., whether to approve or reject an attempted action) when a client attempts to perform an action to a data object associated with the application. The action may comprise, for exemplary purposes only, opening the object, closing the object, deleting the object, or making any modifications to the data that comprises the object. For instance, if the action is modifying the data of the data object, this data server (e.g., the moderator using the rule enforcement logic) may determine and enforce bounds for data values. If a client attempts to modify a numerical value higher than a high threshold defined in the rule enforcement logic, this modification may not be allowed.

If the moderator determines that the client is allowed to modify the data object based on the rule enforcement logic, the data is modified accordingly and changes to the data object may be sent out to other clients who share access to that data object. If, however, the moderator determines that the client is not allowed to modify the data of the data object based on the rule enforcement logic associated with the application, any attempted modifications to the data object are reverted. Further, the attempted modifications are discarded and not saved to the data server such that the client that attempted the modification maintains an accurate representation of the data as it is stored on the server. In one embodiment, when a client attempts to perform an action to the data object, access information is communicated to the developer of the application associated with the data object. This access information may include, for example, details regarding the attempted action (e.g., what the action was, details of the action) and/or the identity of the client that attempted to perform the action to the data object.

Figure 6:
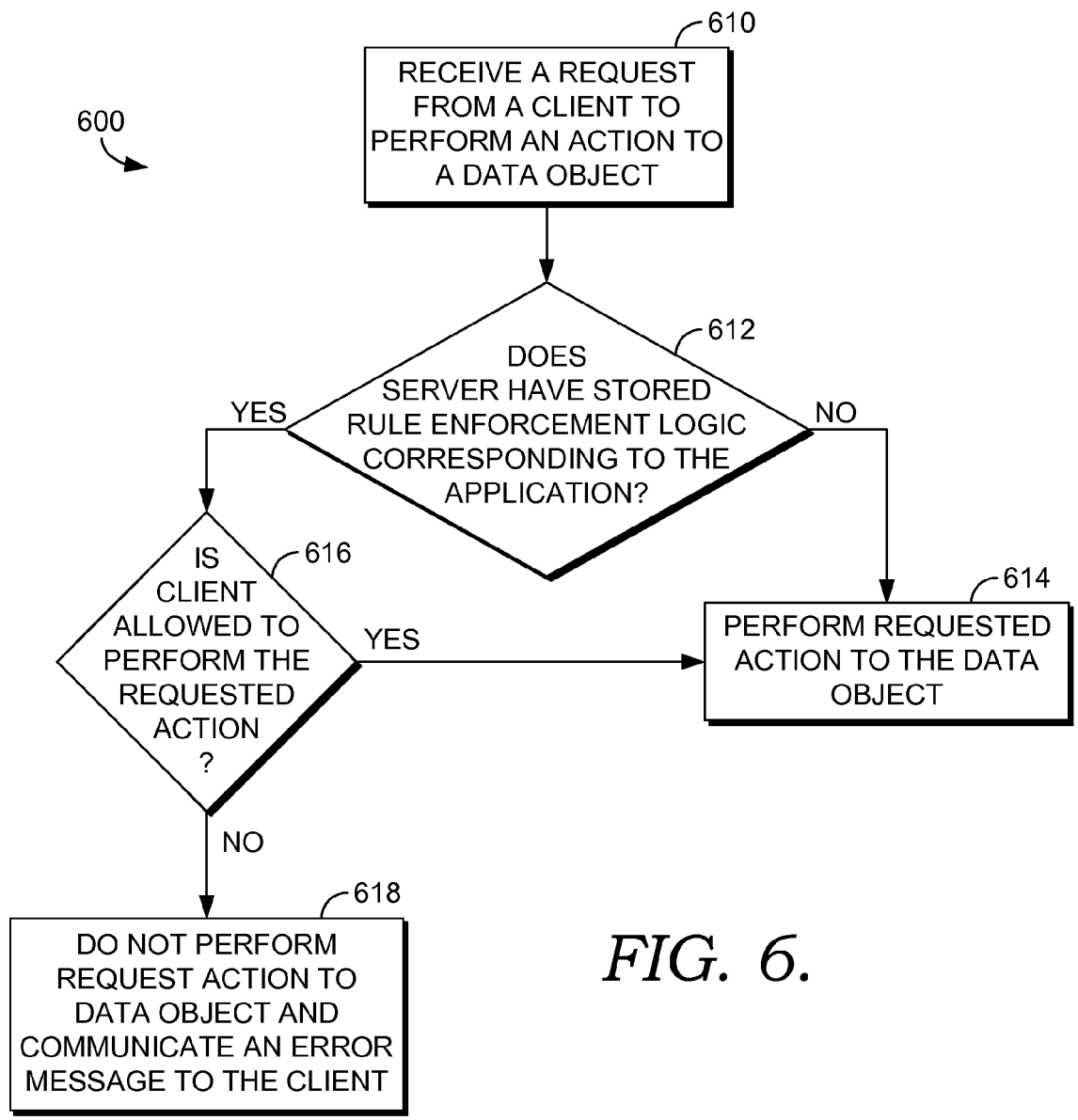
FIG. 6 illustrates a flow diagram showing a method for moderating actions performed on shared data objects, in accordance with an embodiment of the present invention.

Referring to FIG. 6, a flow diagram showing a method 600 for moderating actions performed on shared data objects is shown, in accordance with an embodiment of the present invention. At step 610, a request is received from a client to perform an action to a data object whose data is stored on a data server. This action may include, for exemplary purposed only, opening the data object, deleting the data object, or modifying the data that comprises the data object. It is determined at step 612 whether the data server has stored rule enforcement logic that corresponds to an application associated with the data object. Rule enforcement logic is stored on the data server in correspondence to a particular application having associated data objects whose data is also stored on the data server. If it does not have the rule enforcement logic stored thereon, the requested action is performed to the data object at step 614. If the server does have the rule enforcement logic stored thereon, it is next determined whether the client is allowed to perform the requested action to the data object, shown at step 616. If it is, the requested action is performed to the data object at step 614. If it is not, the requested action is not performed to the data object, shown at step 618. Additionally, an error message is communicated to the client. When at attempted action is made to a data object, access information regarding that attempted action may be communicated to the developer of the application, including details regarding the requested action and/or an identity of the client attempting to perform the requested action to the data object.

As can be understood, embodiments of the present invention provide for cross-language object sharing. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media devices storing computer-useable instructions that, when used by one or more computing devices, cause the one or more computing devices to perform a method of moderating actions performed on shared data objects, the method comprising:

for each of a plurality of different applications, receiving a rule enforcement logic specific to each application of the plurality of different applications that are computer software designed to assist a user to perform tasks, wherein the each application of the plurality of different applications is associated with one or more application instances, each of the one or more application instances containing one or more data objects shared between two or more clients;

for each of the plurality of different applications, storing the rule enforcement logic specific to the each application of the plurality of different applications at a data server that stores data associated with a plurality of data objects and that stores a plurality of sets of rule enforcement logic, each set of rule enforcement logic corresponding to the each application of the plurality of different applications associated with the plurality of data objects;

for each of the plurality of different applications, utilizing a moderator stored on the data server to enforce the rule enforcement logic specific to the each application of the plurality of different applications when one of the two or more clients attempts to perform an action, by way of an application of the plurality of different applications, to one of the plurality of data objects associated with the application and shared between the two or more clients, wherein the action comprises one or more of opening the data object, deleting the data object, or modifying the data that comprises the data object; and in response to the attempt to perform, by way of the application, the action to the data object associated with the application and shared between the two or more clients, providing to a developer of the one of the plurality of data objects associated with the application information corresponding to the action and the identity of the one of the two or more clients attempting to perform the action, wherein the information includes whether the action is one or more of opening the data object, deleting the data object, or modifying the data that comprises the data object.

2. The one or more computer storage media devices of claim 1, wherein the rule enforcement logic specific to the each application of the plurality of different applications is received from a developer of the particular application.

3. The one or more computer storage media devices of claim 1, wherein the two or more clients include one or more of a computer, a web browser, a mobile device, or a gaming system.

4. The one or more computer storage media devices of claim 1, wherein when the action is modifying the data that comprises the data object, the data server determines and enforces bounds for data values.

5. The one or more computer storage media devices of claim 1, wherein the rule enforcement logic specific to the each application of the plurality of different applications is not stored at a client site with code corresponding to the data object.

6. The one or more computer storage media devices of claim 1, wherein the moderator utilizes the rule enforcement logic specific to the each application to determine whether to approve or reject a modification to the data object.

7. The one or more computer storage media devices of claim 1, wherein when the one of the two or more clients attempts to perform the action to the data object, further comprising communicating access information to a corresponding developer.

8. The one or more computer storage media devices of claim 7, wherein the access information includes one or more of details regarding the attempted action or an identity of the client that attempted to perform the action to the data object.

9. The one or more computer storage media devices of claim 1, wherein when the action is modifying the data that comprises the data object, further comprising determine whether the client that is attempting to modify the data of the data object is allowed to modify the data based on the rule enforcement logic specific to the application associated with the data object.

10. The one or more computer storage media devices of claim 9, further comprising:
  if the client is allowed to modify the data of the data object based on the rule enforcement logic specific to the each application of the plurality of different applications, modifying the data of the data object accordingly; and
  if the client is not allowed to modify the data of the data object based on the rule enforcement logic specific to the each application, reverting any modifications such that other clients do not see the attempted modifications.

11. The one or more computer storage media devices of claim 10, further comprising if the client is not allowed to modify the data of the data object based on the rule enforcement logic specific to the each application, discarding the attempted modifications such that the attempted modifications are not saved on the data server.

12. One or more computer storage media devices storing computer-useable instructions that, when used by one or more computing devices, cause the one or more computing devices to perform a method of moderating actions performed on shared data objects, the method comprising:
  for a plurality of different applications, each application having a corresponding rule enforcement logic stored on a data server:
  receiving a request from a client to perform an action to a data object whose data is stored on the data server;
  determining whether the data server has stored a rule enforcement logic corresponding to the application associated with an application instance that contains the data object such that the client is requesting to perform the action to the data object by way of the application, wherein the application is computer software designed to assist a user to perform tasks;
  if the data server has stored the rule enforcement logic corresponding to the application associated with the application instance that contains the data object,
    (1) utilizing the rule enforcement logic corresponding to the application to determine whether the client is allowed to perform the requested action to the data object,
    (2) if it is determined that the client is allowed to perform the requested action to the data object, performing the requested action to the data object,
    (3) if it is determined that the client is not allowed to perform the requested action to the data object, not performing the requested action to the data object and communicating an error message to the client, and
  providing, to a developer of the data object, information about the requested action to the data object by way of the application and identification of the client, wherein the information includes whether the action is one or more of opening the data object, deleting the data object, or modifying the data that comprises the data object; and
  if the data server does not have stored the rule enforcement logic corresponding to the application associated with the data object, performing the requested action to the data object.

13. The one or more computer storage media devices of claim 12, wherein for the plurality of different applications, each application further having stored on the data server data objects associated with the each application.

14. The one or more computer storage media devices of claim 12, wherein the rule enforcement logic corresponding to the application is received from a developer of the application.

15. The one or more computer storage media devices of claim 14, further comprising communicating access information to the developer of the application when the client attempts to perform the requested action to the data object, wherein the access information includes details regarding the requested action and an identity of the client that attempted to perform the requested action to the data object.

16. A shared data system including one or more computing devices having one or more processors and one or more computer storage media, the shared data system comprising:
  a server that comprises:
    a data store that stores data associated with a plurality of data objects and stores a plurality of sets of rule enforcement logic, each set of rule enforcement logic corresponding to at least one of a plurality of different applications, each of the plurality of different applications associated with at least a portion of the plurality of data objects, wherein the each set of rule enforcement logic is developed by and received from a developer of the at least one of a plurality of different applications corresponding to the each set of rule enforcement logic; and
    a moderator embodied on a computing device that enforces the plurality of sets of rule enforcement logic for the plurality of applications associated with the at least the portion of the plurality of data objects such that when a client attempts to perform an action to a data object by way of an application associated with the data object, the moderator determines whether the action is allowed based on a set of rule enforcement logic corresponding to the application associated with the data object, wherein each of the plurality of different applications is associated with one or more application instances, each of the one or more application instances containing at least one of the plurality of data objects that is shared between two or more clients, and wherein, (1) if the moderator determines that the action is allowed, the server allows the action and communicates an indication of the action to the data object by way of the associated application to other clients that share the data object, and (2) if the moderator determines that the action is not allowed, the server does not allow the action and communicates an error message to the client that attempts to perform an action to a data object by way of the associated application, the error indicating that the action is not allowed;

wherein when the client attempts to perform the action to the data object, the server communicates access information to a developer corresponding to the application associated with the data object, wherein the access information includes one or more of details regarding the attempted action or an identity of the client that attempted to perform the action to the data object.

17. The shared data system of claim 16, wherein if the moderator determines that the action is not allowed, the other clients that share the data object are not able to see the attempted action to the data object.

18. The shared data system of claim 16, wherein the server further comprises a plurality of moderators, each moderator of the plurality of moderators corresponding to at least one of the plurality of different applications.

19. The shared data system of claim 16, wherein the moderator is at a level shared with the plurality of applications on the server.

20. The shared data system of claim 16, wherein each set of rule enforcement logic corresponding to the at least one of the plurality of different applications is stored on a moderator corresponding to the at least one of the plurality of different applications.

* * * * *